United States Patent
Dosch et al.

(10) Patent No.: US 11,358,804 B1
(45) Date of Patent: Jun. 14, 2022

(54) APPARATUS AND METHOD FOR CLEANING BIDIRECTIONAL FOOD CONVEYOR BELT

(71) Applicant: General Mills, Inc., Minneapolis, MN (US)

(72) Inventors: Christine M Dosch, Minneapolis, MN (US); Lucas C Judlowe, Hannibal, MO (US); Ralph A Stenvik, Plymouth, MN (US); Zoran Talijan, Wayzata, MN (US); Grace Tarchichi, Mount Laurel, NJ (US); Karl M Thorson, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 17/220,047

(22) Filed: Apr. 1, 2021

(51) Int. Cl.
  *B65G 45/16* (2006.01)
  *B65G 47/46* (2006.01)
  *B65G 43/08* (2006.01)

(52) U.S. Cl.
  CPC ............ *B65G 45/16* (2013.01); *B65G 43/08* (2013.01); *B65G 47/46* (2013.01); *B65G 2201/0202* (2013.01); *B65G 2203/0208* (2013.01); *B65G 2203/043* (2013.01)

(58) Field of Classification Search
  CPC .. B65G 43/08; B65G 2203/042; B65G 45/16; B65G 47/46
  USPC .............................. 198/494, 497, 499, 502.1
  See application file for complete search history.

(56) References Cited

U.S. PATENT DOCUMENTS

| 1,793,246 | A | | 2/1931 | Philips | |
|---|---|---|---|---|---|
| 3,680,684 | A | | 8/1972 | Purdy et al. | |
| 3,841,470 | A | * | 10/1974 | Meguro | B65G 45/16 198/499 |
| 4,087,320 | A | | 5/1978 | Danahy et al. | |
| 5,031,750 | A | | 7/1991 | Barnes | |
| 5,310,042 | A | * | 5/1994 | Veenhof | B65G 45/12 198/497 |
| 5,355,992 | A | | 10/1994 | Baig et al. | |
| 5,649,616 | A | | 7/1997 | Stecklow | |

(Continued)

FOREIGN PATENT DOCUMENTS

| AU | 2003213497 | 2/2004 |
|---|---|---|
| CN | 201012856 | 1/2008 |

(Continued)

*Primary Examiner* — James R Bidwell
(74) *Attorney, Agent, or Firm* — Diederiks & Whitelaw, PLC; John L. Crimmins, Esq.

(57) ABSTRACT

In a food conveyor system configured to drive a conveyor belt in one direction to direct food material for further processing and drive the conveyor belt in a reverse direction upon the sensing of metal in the food material, the conveyor belt is cleaned by one or more belt cleaners including scrapers which are automatically angularly repositioned upon the changing of the drive direction of the conveyor belt, with the angular movement being limited to acute angles relative to the vertical. The belt cleaners are mounted through linkage assemblies for ease of cleaning and replacement. The food conveyor system also employs one or more chute members for directing the food material, with the one or more chute members being mounted through a quick release connection employing keyhole slots upon flexing of the chute member(s).

22 Claims, 5 Drawing Sheets

(56) References Cited

U.S. PATENT DOCUMENTS

| | | | |
|---|---|---|---|
| 6,035,996 A | 3/2000 | Swift | |
| 6,076,656 A * | 6/2000 | Mat | B65G 45/16 198/499 |
| 6,206,175 B1 | 3/2001 | Tschantz | |
| 7,234,586 B1 | 6/2007 | Newman | |
| 7,275,634 B1 * | 10/2007 | Hinson | B65G 45/16 198/497 |
| 9,032,976 B2 | 5/2015 | Berntsen et al. | |
| 2003/0066738 A1 * | 4/2003 | Veenhof | B65G 45/12 198/497 |
| 2005/0109580 A1 | 5/2005 | Thompson | |
| 2010/0139709 A1 | 6/2010 | Saefkow et al. | |
| 2016/0090245 A1 | 3/2016 | Moor et al. | |

FOREIGN PATENT DOCUMENTS

| | | | | |
|---|---|---|---|---|
| CN | 106140680 | * | 11/2016 | ............ B65G 43/08 |
| CN | 106865157 | * | 6/2017 | ............ B65G 43/08 |
| CN | 210358151 | * | 4/2020 | .............. B07C 5/34 |
| CN | 212133729 U | * | 12/2020 | ............ B65G 45/18 |
| CN | 213364730 | * | 6/2021 | ............ G01N 33/10 |
| JP | 2010234579 | | 10/2010 | |

* cited by examiner

APPARATUS AND METHOD FOR CLEANING BIDIRECTIONAL FOOD CONVEYOR BELT

BACKGROUND OF THE INVENTION

The present invention pertains to food conveyor systems and, more particularly, to the cleaning of a metal detector conveyor belt system used in food production applications.

When producing food products on a commercial scale, the food products are often transported around a factory using a conveyor system. Such conveyor systems frequently include one or more conveyor belts. When transporting food products prior to final packaging, the food products sometimes leave particulate and/or liquid residue behind on the conveyor belts. This is true in a wide range of food production areas, including cereal and soup production industries. In general, these types of conveyor belts recirculate around rollers. With such an arrangement, the rollers can be directly exposed to the particulate and/or liquid residue. To avoid this problem, it is known to clean the belts, such as with wiping blades or fluid streams which continuously clean the belt. Certainly, such a cleansing operation can get particularly more complicated if the conveyor belt changes direction during operation.

SUMMARY OF THE INVENTION

The present invention provides an apparatus and method for cleaning residue from bi-directional food conveyor belts. More specifically, a central portion of a conveyor belt receives a substantially continuous supply of food material and transports the food material in a first direction through a metal detector. If no metal is detected, the food material is then directed toward a subsequent processing station, e.g., a packaging station, adjacent one end portion of the conveyor. However, if a controller receives a signal from the metal detector indicative of the existence of metal in the food material (i.e., a positive metal detection signal) on the conveyor, the food supply line is paused and the conveyor drive is reversed to divert the food material on the conveyor in a second, opposite direction. Upon reaching another end portion of the conveyor, the food material is discharged from the supply line. After the conveyor has traveled a predetermined distance or time to assure that all of the supported food material has been removed, the controller automatically redirects the conveyor to again be driven in the first direction and the supply line is released from its paused condition to continue with transporting the food material toward the subsequent processing station.

The conveyor belt is an endless belt which passes around multiple rollers as the conveyor belt changes from traveling in the first direction to traveling in the second direction, with at least one of the rollers constituting a drive roller. In accordance with one particular aspect of the invention, one or more belt cleaning members, such as scrapers, are provided which engage with the conveyor belt in order to prevent build-up of particulate and/or fluid residue deposited on the belt for sanitation purposes. More specifically, each cleaning member is mounted through a linkage assembly for selective movement between an in-use position, wherein the cleaning member engages with the conveyor belt below an upper food surface supporting level, and a non-use position wherein the cleaning member can be serviced. When in the in-use position, the cleaning member extends transversely or laterally across the conveyor belt at an acute angle to the vertical opposite a direction of travel of the upwardly facing food supporting level of the conveyor belt. More specifically, the cleaning member is mounted through a pivot connection enabling the cleaning member to automatically shift from angling toward the second end portion of the conveyor belt when the belt is traveling in the first direction to angling toward the first end portion of the conveyor belt when the belt is driven in the reverse direction.

In accordance with another aspect of the invention, provided directly adjacent the first end portion of the conveyor belt are upper and lower chute members. Each of the chute members is formed from a flexible material and attached to supporting structure by quick release mounts. In a preferred mounting embodiment, each chute member is provided with spaced keyhole slots, each having an enlarged diametric opening leading to a narrowed slot, while the supporting structure is provided with spaced mounting pegs, each with an enlarged head and reduced diameter shaft portion. When mounting, each chute member is flexed to assume a concave condition, each enlarged diametric opening is aligned with and receives a respective one of the enlarged peg heads and then the chute member is shifted downward causing the reduced diametric shaft portions to slide along the narrowed slot until a desired mounting position is achieve (e.g., the shaft portions reach the end of the narrowed slots). Upon being released, the chute member remains partially flexed and will be frictionally retained in an operative position. The keyhole slots are arranged so that forces applied by the food material hitting and being deflected by the chute members will not lead to release of the chute members. However, removal of the chute members for cleaning or replacement purposes can be readily performed without the need for any tools.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
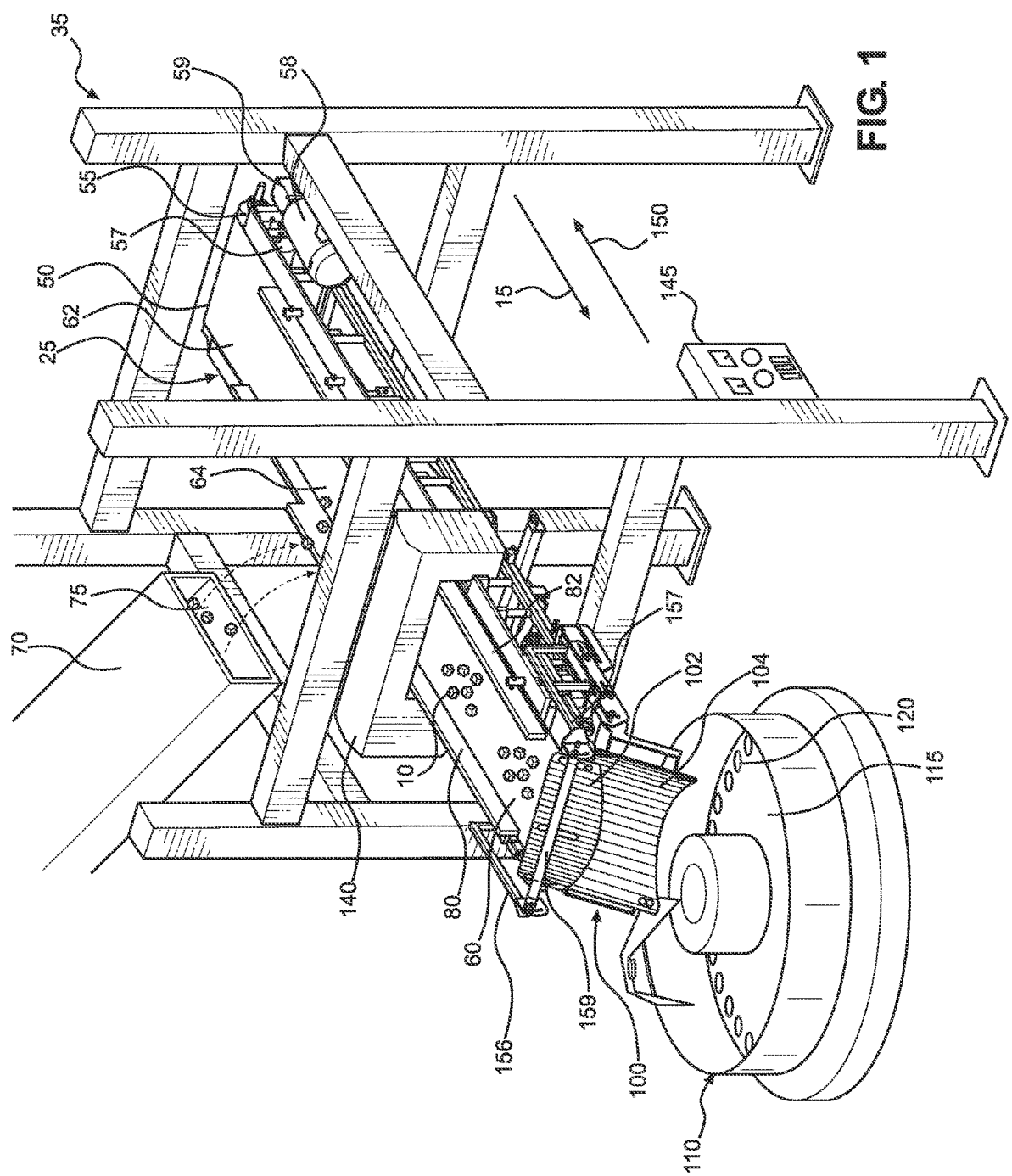
FIG. 1 is a perspective view of a portion of a production line constructed in accordance with the present invention.

With initial reference to FIG. 1, there is shown a portion of a food product production line constructed in accordance with the present invention. Specifically, FIG. 1 shows food material 10 being transported in a direction 15 by a conveyor system 25. At this point in the process, food material 10 is loose, i.e., unpackaged. For example, food material 10 can comprise a plurality of ingredients for soup, like meat chunks, vegetable pieces, onion slices and the like. However, the specific type of food material can greatly vary. For example, the food material could be cereal pieces for a ready-to-eat cereal product. In any case, conveyor system 25 is mounted to a support structure 35 and includes an endless conveyor belt 50 which extends around a plurality of rollers, including a rear return roller 55 and a drive motor 57 driven by a motor 58 through a gearing unit 59. Conveyor belt 50 includes a first or front end portion 60, a second or rear end portion 62, and a central portion 64. Within central portion 64, conveyor belt 50 receives food material 10 from a supply line 70 including a discharge port 75, with food material 10 being laterally retained upon conveyor belt 50 by side walls members 80 and 82. In traveling in supply direction 15, food material 10 is delivered upon conveyor belt 50 towards a chute assembly 100 arranged at first end portion 60. In the embodiment shown, chute assembly 100 includes an upper chute member 102 and lower chute member 104 which direct food material 10 toward a subsequent processing station 110. In one embodiment wherein conveyor system 25 is employed in making soup, processing station 110 includes a rotating drum 115 having a plurality of outlet ports 120 beneath which are arranged containers into which the food material 10 is directed for initial packaging. As the particulars of processing station 110 are not part of the present invention, they will not be further discussed herein.

Arranged between central portion 64 and first end portion 60 of conveyor belt 50 is a metal detector 140. As clearly shown in this figure, food material 10 is directed upon conveyor belt 50 below metal detector 140 which is linked to a controller, generically indicated at 145. As will be detailed more fully below, controller 145 is also connected to motor 58, as well as the supply for line 70 wherein, when metal detector 140 outputs a signal indicating the presence of metal within food material 10, controller 145 operates to cease the supply of food material through line 70 and redirects conveyor belt 50 to be driven in a second or reverse direction 150 by controlling motor 58.

Figure 2:
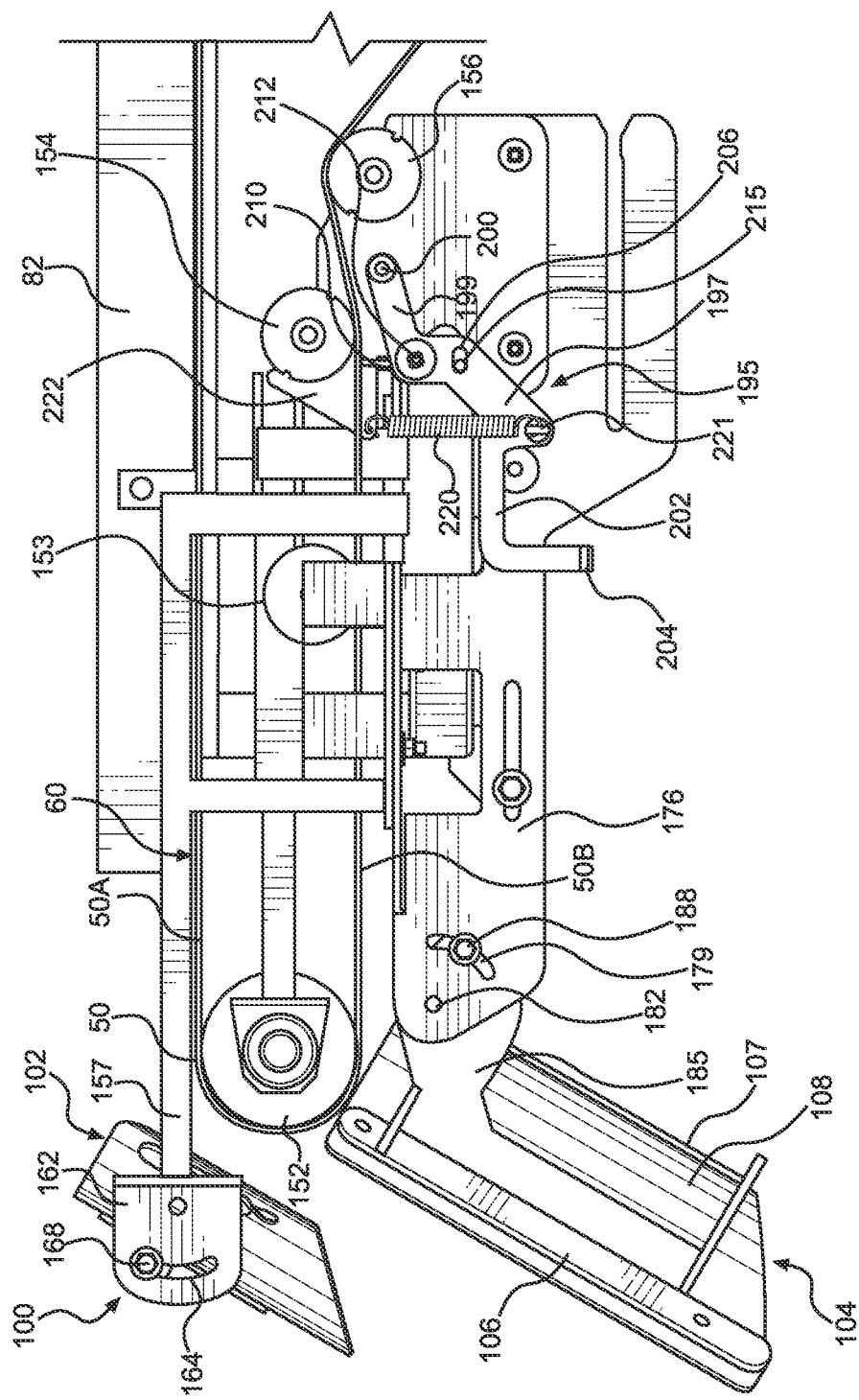
FIG. 2 is a side view of a front section of the production line shown in FIG. 1.

Reference will now be made to FIG. 2 in describing additional structure associated with conveyor system 25. As shown, conveyor belt 50 also extends around a forward idle roller 152, as well as a plurality of spaced guide rollers 153, 154 and 156. Extending forward from first end portion 60 are a pair of laterally spaced arms 156 and 157 (also see FIG. 1) between which extends a cross member 159. Attached to an end of each laterally spaced arm 156, 157 is a L-shaped plate 162 including an arcuate slot 164 at which cross member 159 is secured by a bolt 168. Arranged below idle roller 152 and guide roller 153 are laterally spaced support plates, one of which is indicated in FIG. 2 at 176. At a forward portion of support plate 176 is provided an arcuate slot 179 and a pivot axle 182 for laterally spaced arms 185 used to support lower chute member 104 through elongated terminal chute supports 106 and 107, as well as a central arcuate support portion 108. Each arm 185 is thereby pivotable about axle 182 while being selectively securable in a desired angular position by the tightening of bolts 188, each of which extends through the slot 179 of a respective support plate 176. Further details of the mounting and selective removal of each of upper and lower chute members 102 and 104 will be discussed hereinafter with particular reference to FIG. 5.

In accordance with an aspect of the invention, conveyor system 25 includes one or more belt cleaning assemblies acting on a lower rung 50B of conveyor belt 150 below the food support surface, with a first belt cleaning assembly generally indicated at 195 in FIG. 2. As shown, belt cleaning assembly 195 constitutes a linkage assembly including a lever arm having a central arm portion 197, a distal arm portion 199 which is attached at pivot mount 200, an extension arm portion 202 and a handle portion 204. Although not shown based on the view provided, another linkage assembly is also preferably provided on an opposing lateral side of conveyor belt 50. Located within central arm portion 197 is a substantially horizontally extending slot 206. Belt cleaning assembly 195 also includes a belt cleaning member 210 generally constituted by a scraper which is in direct contact with a lower rung 50B of conveyor belt 50 as clearly shown in this figure. Belt cleaning member 210 is mounted for pivotable movement about a pivot axis 212 and includes a pin 215 which extends through slot 206. The positioning of pin 215 within slot 206 establishes a pivot limiting assembly which defines the permissible pivotable movement of belt cleaning member 210 relative to both conveyor belt 50 and the vertical. In particular, with the food supporting surface or upper rung 50A of conveyor belt 50 being driven in supply direction 15, it can be seen that belt cleaning member 210 is acutely angled relative to the vertical toward the rear end of conveyor system 25, with pin 215 abutting a forward edge (not labeled) of central arm portion 197 at slot 206. Belt cleaning member 210 is biased into engagement with conveyor belt 50 by means of a spring 220 that is attached at one end to a mounting projection 221 extending from central arm portion 197 and a second end positioned within a hole (not labeled) provided in a fixed plate 222. Through the use of handle portion 204, belt cleaning member 210 can be repositioned out of engagement with conveyor belt 50 by pulling down on handle portion 204 to cause pivoting of distal arm portion 199 about pivot mount 200 against the biasing force of spring 220 to enable cleaning and/or replacing of belt cleaning member 210.

Figure 3:
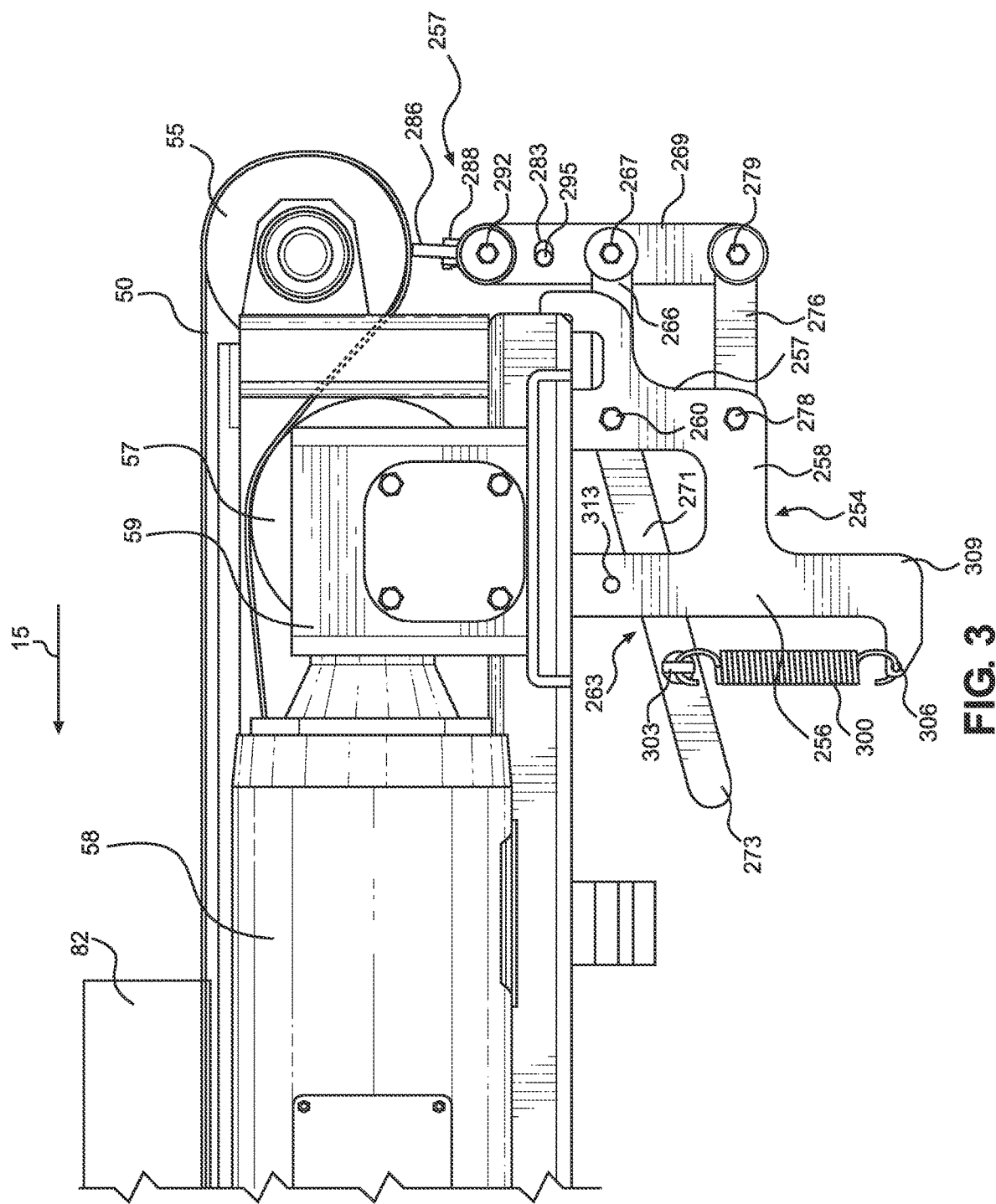
FIG. 3 is a side view of a rear section of the production line shown in FIG. 1.
Figure 4:
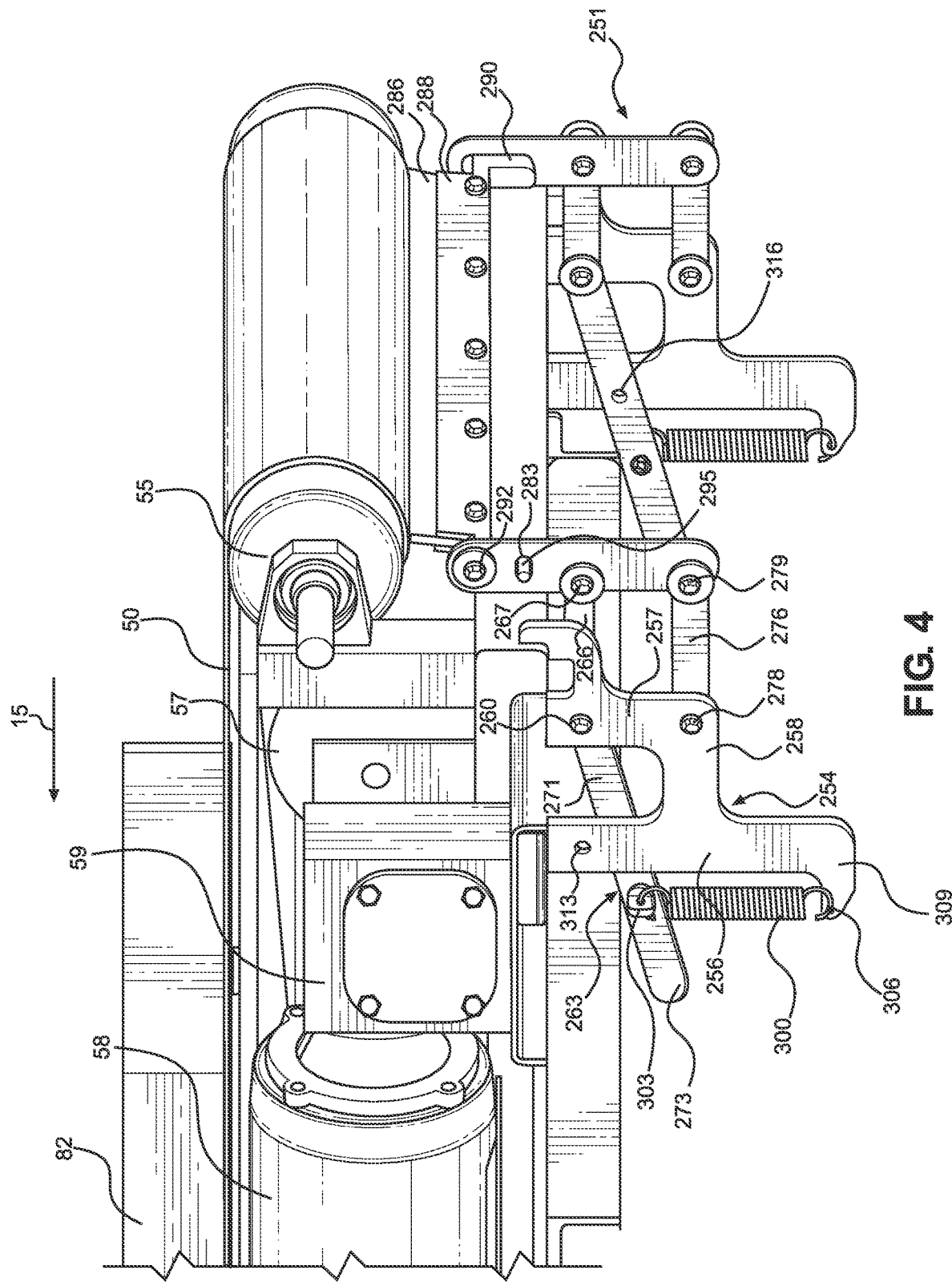
FIG. 4 is a perspective view of the rear section of FIG. 3.

Reference will now be made to FIGS. 3 and 4 in describing the structure of a second belt cleaning assembly 251 employed with conveyor system 25. At this point, as with belt cleaning assembly 195, it should be noted that belt cleaning assembly 251 includes right and left linkage assemblies which are correspondingly constructed such that one side will be described in detail and it is to be understood that corresponding structure is provided on the other side. In particular, as shown, belt cleaning assembly 251 includes a support mount 254 that generally takes the form of an inverted h-shaped mount including a first leg 256, a second leg 257 and a connecting leg 258. Established along second leg 257 is a pivot axis 260 such as by a bolt or pin for a lever arm 263. Lever arm 263 includes a distal arm portion 266 which is attached at a pivot mount 267 to an upstanding arm 269. Lever arm 263 also includes an extension arm portion 271 and a handle portion 273. A lower link 276 extends between a pivot mount 278 on second leg 257 to a pivot mount 279 provided at a lower end of upstanding arm 269. Upstanding arm 269 is provided with a substantially horizontally extending slot 283. Mounted to upstanding arm 269 is a replaceable belt cleaning member (scraper) 286 which is supported (clamped) by a cleaning member mount 288 including terminal mounting blocks 290. Each terminal mounting block 290 is rotatably attached to a respective upstanding arm 269 through a pivot mount 292 defining an axis of rotation, with cleaning member mount 288 also including a pin 295 which projects into slot 283 to limit the permissible pivoting movement of belt cleaning member 286 relative to belt 50, upstanding arm 269 and the vertical.

As with belt cleaning member 210 of belt cleaning assembly 195, belt cleaning member 286 is arranged at an acute angle to the vertical as conveyor 50 is driven in supply direction 15, with pin 295 engaging upstanding arm 269 at slot 283. A spring 300 extends between a mounting projection 303 and a hole 306 formed in a leg extension 309 of first leg 256, with spring 300 biasing lever arm 63 downward and, correspondingly, belt cleaning member 286 upward into engagement with conveyor belt 50. First leg 256 is also shown to be provided with an upper repositioning hole 313 and extension arm portion 271 includes a retention hole 216 (FIG. 4). With this arrangement, when it is desired to manually disengage belt cleaning member 286 from conveyor belt 50, end portion 273 can be lifted against the biasing force of spring 300 until upper repositioning hole 303 becomes aligned with retention hole 316, at which point a pin (not shown) can be inserted through these aligned holes. In this fashion, second belt cleaning assembly 251 can be retained in a retracted position for the cleaning or replacement of belt cleaning member 286.

As mentioned above, during operation of conveyor system 25, food material 10 is directed upon conveyor 50 and, so long as metal detector 140 does not detect any metal in food material 10, supply line 70 continues to supply food material 10 onto central portion 64. The food material 10 landing atop conveyor belt 50 can be either wet or dry. In either case, residue material will develop on conveyor belt 50 and, at least to some extent, will remain on conveyor belt 50 as the conveyor belt extends around front idle roller 152. With belt cleaning member 210 and belt cleaning member 286 in engagement with conveyor belt 50, this residue will be scraped from conveyor belt 50 before those portions of conveyor belt 50 receive additional food material 10. If, during operation of conveyor system 25, metal detector 140 senses metal in food material 10, conveyor belt 50 will automatically be reversed such that the upper rung 50A will be driven in direction 150 (FIG. 1) while the discharge of new food material 10 onto conveyor belt 50 from supply line 70 is paused. Under these circumstances, conveyor belt 50 will be driven in this reverse direction for either a predetermined distance or time necessary for all the food material 10 carried by conveyor belt 50 at that time is discarded within a bin or the like (not shown) arranged below rear return roller 55. At the same time, when conveyor belt 50 is driven in reverse direction 150, the engagement between conveyor belt 50 and each of belt cleaning members 210 and 286 will automatically force belt cleaning members 210 and 286 to an opposing acute angle relative to the vertical. More specifically, for belt cleaning member 210, rotation about pivot axis 212 will automatically occur with this pivoting movement being limited by the travel distance of pin 215 within slot 206. In a similar manner, belt cleaning member 286 will also automatically pivot from the positions shown in FIGS. 3 and 4 about pivot axis 292, based on the direct frictional engagement with conveyor belt 50, so as to be angled forward at an acute angle as defined by the movement of pin 295 within slot 283. Therefore, each belt cleaning member 210 and 286 is angled, with respect to the vertical, in a direction opposite a travel direction of the conveyor belt (note the travel direction is construed in accordance with the invention based on the direction of movement of the upper food supporting surface). This angular repositioning of belt cleaning members 210 and 286 has been found to be particularly effective in enhancing the ability of belt cleaning assemblies 195 and 251 to properly clean belt 50 during operation, with the combined angular movement, i.e., sum of the acute angles, still representing an acute angle.

Figure 5:
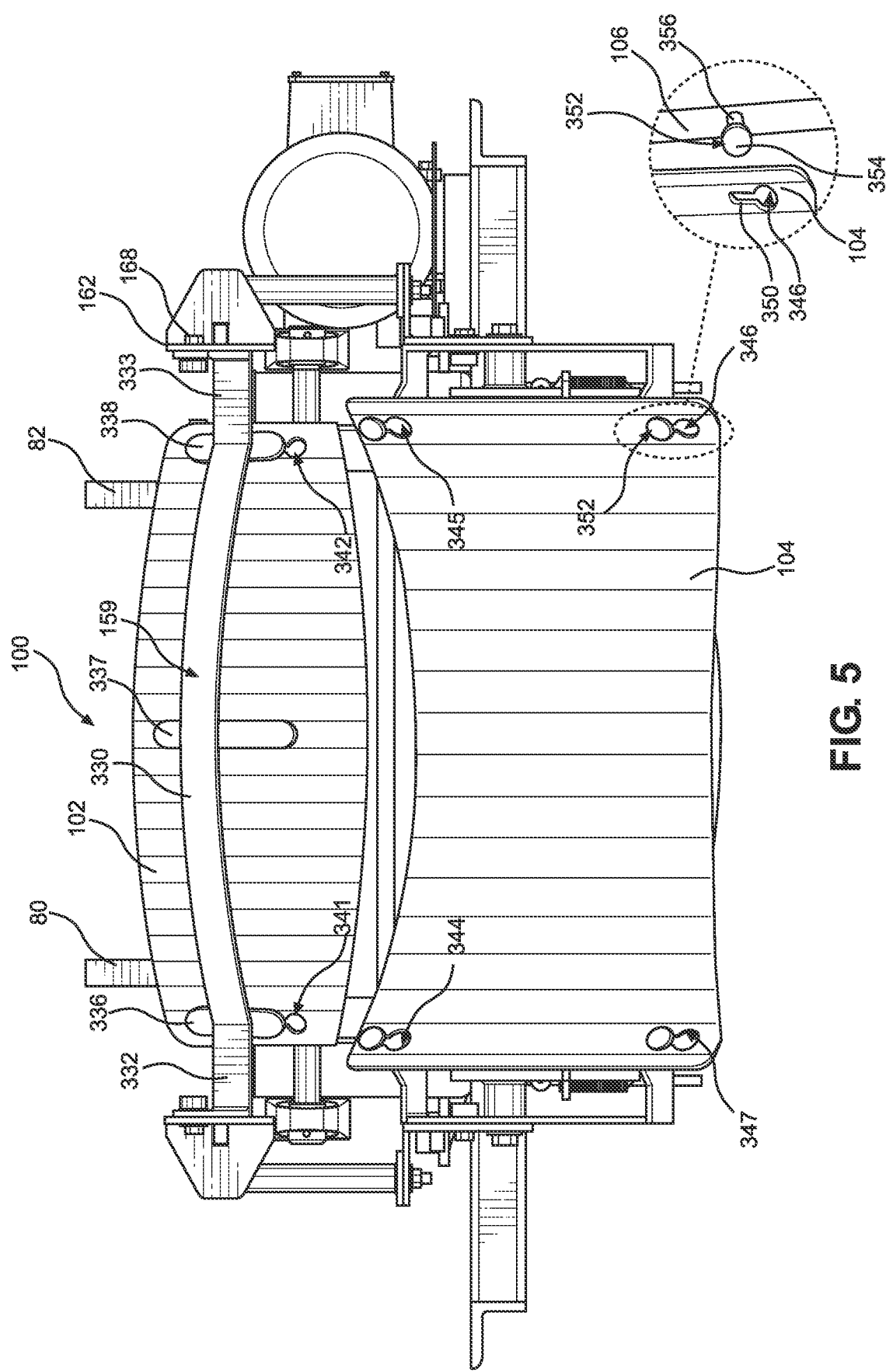
FIG. 5 is an enlarged frontal view of the production line of FIG. 1.

Reference will now be made to FIG. 5 in describing another aspect of the invention in connection with a preferred mounting of each of upper chute member 102 and lower chute member 104. Shown in more detail in this figure is cross member 159 which includes a central arcuate portion 330 and terminal straightened portions 332 and 333. Cross member 159 also has fixedly attached thereto a plurality of spaced chute supports 336-338. At the same time, upper chute member 102 is formed with a pair of spaced keyhole slots 341 and 342 which are generally aligned with chute supports 336 and 338, respectively. In a similar manner, lower chute member 104 is formed with a plurality of keyhole slots 344-347. As exemplified by keyhole slot 346, each keyhole slot 341, 342 and 344-347 includes an enlarged diametric opening 349 leading to a narrowed slotted opening 350. For use in mounting upper chute member 102 and lower chute member 104, a series of mounting pegs are employed which become aligned and cooperate with respective ones of keyhole slots 341, 342 and 344-347. One such mounting peg arrangement is detailed in FIG. 5 at 352 to include an enlarged head 354 and a reduced diametric shaft portion 356. For upper chute member 102, mounting occurs by flexing upper chute member 102, which is preferably made of plastic, against arcuate cross member 159 while aligning keyholes slots 341 and 342 with mounting pegs 352 extending from chute supports 336 and 338. Once a respective enlarged head 354 is received in a respective enlarged diametric opening 349, upper chute member 102 can be shifted downward such that the reduced diametric shaft portion 356 slides in a respective narrowed slotted opening 350. The same is true in connection with flexing and mounting of lower chute member 104 through the use of keyholes 344-347 and respective mounting pegs 352 which are affixed to elongated terminal chute supports 106 and 107 discussed above with reference to FIG. 2. Upon being released, the upper and lower chute members 102 and 104 remain partially flexed in concave conditions and will be frictionally retained in their operative positions. The keyhole slots 341, 342 and 344-347 are arranged so that forces applied by the food material 10 hitting and being deflected by the chute members 102 and 104 will not lead to release of chute members 102 and 104. However, removal of chute members 102 and 104 for cleaning or replacement purposes can be readily performed through this overall quick release arrangement without the need for any tools.

Based on the above, it should be readily apparent that the present invention provides a way to prevent residue left behind on a bidirectional food conveyor belt from accumulating below the conveyor belt. In addition, the invention provides for an efficient manner to clean and/or replace the one or more scrapers, as well as chute members. While certain preferred embodiments of the present invention have been set forth, it should be understood that various changes or modifications could be made without departing from the spirit of the present invention.

The invention claimed is:
1. A conveyor assembly comprising:
an idle roller;
a drive roller spaced from the idle roller;
a motor for driving the drive roller;
a conveyor belt extending around both the idle roller and the drive roller, said conveyor belt including a first end portion, a second end portion and a central portion spacing the first and second end portions, said conveyor belt being configured to be driven upon operation of the motor to transport food material in either a first direc- tion toward a further processing station and an opposing, second direction away from the further processing station;
a food material supply line configured to introduce the food material at the central portion of the conveyor belt;
a metal detector provided between the first end portion of the conveyor belt and the food material supply line, with the metal detector being configured to output a metal detection signal when metal is detected in the food material transported in the first direction;
a controller configured to control the motor to cause the conveyor belt to be driven in the second direction upon receipt of a metal detection signal from the metal detector; and
a belt cleaning member configured to clean residue food material from the conveyor belt by engaging the conveyor belt during operation of the conveyor belt in each of the first and second directions, wherein the belt cleaning member is automatically repositioned from a first acute angle with respect to a vertical to a second acute angle with respect to the vertical upon the conveyor belt being switched between drive in the first direction versus the second direction.

2. The conveyor assembly of claim 1, wherein the belt cleaning member is angled, with respect to the vertical, in a direction opposite a travel direction of the conveyor belt.

3. The conveyor assembly of claim 1, wherein the belt cleaning member is constituted by a scraper.

4. The conveyor assembly of claim 3, wherein the conveyor belt has a top surface for receiving the food material from the food material supply line, with top surface becoming a bottom surface as the conveyor belt extends about one of the idle and drive rollers, said scraper engaging the bottom surface of the conveyor belt.

5. The conveyor assembly of claim 3, further comprising a support member attached to the scraper, said support member being mounted for pivotal movement to accommodate automatically repositioning of the belt cleaner.

6. The conveyor assembly of claim 5, further comprising a pivot limiting assembly for limiting pivotal movement of the scraper between the first and second acute angles.

7. The conveyor assembly of claim 1, wherein a sum of the first and second acute angles is an acute angle.

8. The conveyor assembly of claim 1, further comprising a linkage assembly for selectively shifting the belt cleaning member between an in-use position in which the belt cleaning member engages the conveyor belt during operation and a non-use position wherein the belt cleaning member is spaced from the conveyor belt for cleaning or replacement of the belt cleaning member.

9. The conveyor assembly of claim 1, wherein the belt cleaning member engages the conveyor belt at the first end portion, said conveyor assembly including another belt cleaning member configured to engage the conveyor belt at the second end portion.

10. The conveyor assembly of claim 1, further comprising:
at least one chute member spaced from the first end portion of the conveyor belt for deflecting the food material toward the packaging station; and
a quick release connection selectively removably mounting the at least one chute member relative to the conveyor belt.

11. The conveyor assembly of claim 10, wherein the quick release connection includes spaced keyhole slots formed in the at least one chute member, each having an enlarged diametric opening leading to a narrowed slot, and spaced mounting pegs provided on supporting structure adjacent the first end portion of the conveyor belt, with the mounting pegs being aligning with and received in the keyhole slots.

12. The conveyor assembly of claim 11, wherein the mounting pegs are aligning with and receivable in the keyhole slots only when the at least one chute member is placed in a flexed state.

13. The conveyor assembly of claim 12, wherein the at least one chute member includes upper and lower chute members guiding the food material toward the packaging station.

14. A conveyor assembly comprising:
an idle roller;
a drive roller spaced from the idle roller;
a motor for driving the drive roller;
a conveyor belt extending around both the idle roller and the drive roller, said conveyor belt including a first end portion, a second end portion and a central portion spacing the first and second end portions, said conveyor belt being configured to be driven upon operation of the motor to transport food material in either a first direction toward a further processing station and an opposing, second direction away from the further processing station;
a food material supply line configured to introduce the food material at the central portion of the conveyor belt;
a metal detector provided between the first end portion of the conveyor belt and the food material supply line, with the metal detector being configured to output a metal detection signal when metal is detected in the food material transported in the first direction;
a controller configured to control the motor to cause the conveyor belt to be driven in the second direction upon receipt of a metal detection signal from the metal detector, wherein the controller is configured to control the motor to cause the conveyor belt to be driven for a predetermined time or distance in the second direction and then automatically reversing the motor to drive the conveyor belt in the first direction; and
a belt cleaning member configured to clean residue food material from the conveyor belt by engaging the conveyor belt during operation of the conveyor belt in each of the first and second directions, wherein the belt cleaning member is automatically repositioned from a first acute angle with respect to a vertical to a second acute angle with respect to the vertical upon the conveyor belt being switched between drive in the first direction versus the second direction.

15. A method of operating a conveyor assembly including a conveyor belt which extends around both an idle roller and a drive roller which is spaced from the idle roller and driven upon operation of a motor and includes a first end portion, a second end portion and a central portion spacing the first and second end portions, said method comprising:
supplying food material from a food supply line initially onto the central portion of the conveyor belt as the conveyor belt travels in the first direction toward a further processing station;
outputting a metal detection signal to a controller when metal is detected in the food material by a metal detector located between the first end portion of the conveyor belt and the food material supply line as the food material is transported in the first direction;
through the controller, controlling the motor to cause the conveyor belt to be driven in an opposing, second direction away from the further processing station upon receipt of the metal detection signal from the metal detector; and automatically repositioning a belt cleaning member, configured to clean residue food material from the conveyor belt during operation of the conveyor belt in each of the first and second directions, from a first acute angle with respect to a vertical to a second acute angle with respect to the vertical upon the conveyor belt being switched between drive in the first direction versus the second direction.

16. The method of claim 15, wherein the belt cleaning member is angled, with respect to the vertical, in a direction opposite a travel direction of the conveyor belt.

17. The method of claim 15, wherein the belt cleaning member is automatically repositioned through pivotal movement based on direct contact between the conveyor belt and the belt cleaning member.

18. The method of claim 17, further comprising limiting the pivotal movement to only between the first and second acute angles, with wherein a sum of the first and second acute angles is an acute angle.

19. The method of claim 15, further comprising control the motor to cause the conveyor belt to be driven for a predetermined time or distance in the second direction and then automatically reversing the motor to drive the conveyor belt in the first direction.

20. The method of claim 15, further comprising selectively shifting the belt cleaning member between an in-use position in which the belt cleaning member engages the conveyor belt during operation and a non-use position wherein the belt cleaning member is spaced from the conveyor belt for cleaning or replacement of the belt cleaning member.

21. The method of claim 15, further comprising:

mounting at least one chute member at a position adjacent the first end portion of the conveyor belt through a quick release connection; and deflecting the food material toward the further processing station with the at least one chute member as the conveyor belt travels in the first direction.

22. The method of claim 21, wherein mounting the at least one chute member through the quick release connection includes flexing the at least one chute member to align enlarged diametric openings of spaced keyhole slots formed in the at least one chute member with enlarged heads of spaced mounting pegs provided on supporting structure adjacent the first end portion of the conveyor belt and then shifting the at least one chute member relative to the mounting pegs.

* * * * *